US006635203B2

(12) United States Patent
Monaci

(10) Patent No.: US 6,635,203 B2
(45) Date of Patent: Oct. 21, 2003

(54) COMPOSITE POLYMERIC MATERIAL HAVING HIGH RESISTANCE TO IMPACT ENERGY

(76) Inventor: Roberto Monaci, Via Fregene, 13, 30038 Spinea (IT)

( * ) Notice: Subject to any disclaimer, the term of this patent is extended or adjusted under 35 U.S.C. 154(b) by 0 days.

(21) Appl. No.: 09/972,716

(22) Filed: Oct. 9, 2001

(65) Prior Publication Data

US 2002/0064643 A1 May 30, 2002

Related U.S. Application Data

(63) Continuation-in-part of application No. 09/100,349, filed on Jun. 19, 1998, now Pat. No. 6,326,077.

(30) Foreign Application Priority Data

Jun. 25, 1997 (IT) .......................................... TV97A0085

(51) Int. Cl.⁷ .......................... B29C 67/20; B29C 67/24; B29D 9/00
(52) U.S. Cl. ..................... 264/45.4; 264/46.9; 264/478; 428/313.5; 521/56; 521/904
(58) Field of Search .......................... 428/313.5, 316.6, 428/317.7, 909; 521/56, 904; 264/46.9, 478, 45.4

(56) References Cited

U.S. PATENT DOCUMENTS

| 3,996,654 | A | * | 12/1976 | Johnson | .................. | 264/46.9 X |
| 4,782,098 | A | | 11/1988 | Allen et al. | ................ | 521/56 X |
| 5,080,411 | A | | 1/1992 | Stewart et al. | ........... | 293/102 X |
| 5,093,936 | A | | 3/1992 | Copeland et al. | ............ | 2/410 X |
| 5,252,270 | A | * | 10/1993 | Haardt et al. | ............... | 264/45.4 |
| 5,298,208 | A | | 3/1994 | Sibley et al. | .................. | 264/51 |
| 5,699,561 | A | | 12/1997 | Broersma | ................... | 2/411 X |
| 6,326,077 | B1 | * | 12/2001 | Monaci | .................... | 428/315.5 |

FOREIGN PATENT DOCUMENTS

| DE | 9480191 | 8/1956 | |
| DE | 2 500 117 | 7/1976 | |
| EP | 0323038 | 7/1989 | .................. 293/102 |
| GB | 1591621 | 6/1981 | ................... 441/80 |
| GB | 2 298 424 | 9/1996 | |
| JP | 0017696 | 5/1986 | .................. 293/109 |
| JP | 1164648 | 6/1989 | .................. 293/109 |
| JP | 402265737 | 10/1990 | ............... 428/317.1 |

OTHER PUBLICATIONS

Database WPI Section Ch, Week 9338 Derwent Publications Ltd., London GB; Class A13, AN 93–2989742 XPOO2075838 & JP 05 214155A (Nippon Polyurethane Kogyo KK), Aug. 24, 1993 *Abstract*.

* cited by examiner

*Primary Examiner*—Richard D. Lovering
(74) *Attorney, Agent, or Firm*—Guido Moniano; Albert Josif; Daniel O'Byrne

(57) ABSTRACT

A method for producing manufactured articles made of composite material comprising the steps of: First completely filling a mold with granules of a pre-expanded polymer in granular form, selected from the group consisting of polystyrene, polypropylene, copolymer of polyphenylene oxide and polystyrene and mixtures thereof; subsequently injecting in the mold an isocyanate mixed with a compound possessing active hydrogen whereby they are filled in void spaces among the granules; and condensing said isocyanate with said compound possessing active hydrogen to yield a polyurethane foam which, by expanding, subsequently completely fills the spaces among the pre-expanded polymer granules.

8 Claims, No Drawings

COMPOSITE POLYMERIC MATERIAL HAVING HIGH RESISTANCE TO IMPACT ENERGY

This is a continuation-in-part application of U.S. application Ser. No. 09/100,349, filed on Jun. 19, 1998, now U.S. Pat. No. 6,326,077.

BACKGROUND OF THE INVENTION

The present invention relates to a composite polymeric material having high resistance to impact energy.

Specifically, the present invention relates to a composite polymeric material, to the corresponding preparation process and to manufactured articles having high impact energy absorption.

Currently, manufactured articles for automotive parts capable of absorbing impact energy, such as structures for vehicle interiors and exteriors, motorcycle crash helmets and others, are made of a single material having a polymeric base, such as expanded polystyrene, expanded polypropylene, or polyurethane foams.

These manufactured articles are generally produced with a molding technology which entails injecting an expandable polymer into a mold having a preset shape and then expanding the polymer in the presence of catalysts and/or expansion agents. At the end of the expansion, the polymer hardens and acquires the preset shape of the mold.

In particular, in the production of polyurethane manufactured articles, polyisocyanates and polyesters or glycols are injected into the mold and are made to polymerize in the presence of catalysts and expansion agents. During polymerization, the polyurethane foam forms and, by expanding, takes the shape of the mold.

However, manufactured articles resistant to impact energy made of a single polymeric material produced according to conventional technology are not free from having drawbacks in use, mainly due to the fact that they are made of a single polymeric material which does not provide an adequate resistance response to the impact, and to the shock wave. In particular, the only variable that is available to the designer is the density of the material.

For example, impact-resistant manufactured articles made of a single polymer according to the prior art, particularly expanded polystyrene helmets for motorcycles, have the drawback that they lose their impact-resistance characteristics after a single impact that causes a permanent deformation of the structure.

In the case of fenders for cars or of motorcycle helmets, permanent deformation after an impact accordingly compromises their safety characteristics, forcing the user to replace the manufactured article.

SUMMARY OF THE INVENTION

One of the aims of the present invention is to eliminate or substantially lessen the drawbacks of the prior art.

Another object of the present invention is to provide a composite polymeric material which has high-level impact energy resistance characteristics and has a long life.

A further object of the present invention is to provide a composite polymeric material which is simple to produce and does not entail high production costs.

Yet another object is to provide a manufactured article made of composite polymeric material which combines low weight with high mechanical strength characteristics.

Another object of the invention is to provide a method for producing manufactured articles made of an impact-resistant composite material whose execution entails modest operating and energy-related costs.

With the foregoing and other objects in view, there is provided, in accordance with a first aspect of the present invention, a composite material comprising a pre-expanded polymer, preferably in granular form, selected from the group consisting of polystyrene, polypropylene, a copolymer of polystyrene with a melting point above 90° C. and mixtures thereof, dispersed in a resin selected from the group consisting of melaminic resin, phenolic resin, polyurethane resin and mixtures thereof, the polyurethane resin being the preferred one among them. The expression "polystyrene copolymer" denotes a product of polymerization of polystyrene with another polymer or an alloy of polystyrene with another polymer.

DESCRIPTION OF PREFERRED EMBODIMENTS

Among polystyrene copolymers having a melting point above 90° C., preference is given to those with a melting point above 100° C.; among these, particular preference is given to the copolymer of polyphenylene oxide (PPO) and polystyrene (PS). By way of example, mention is made of the copolymer of polyphenylene oxide and polystyrene marketed under the trade-name NORYL EF (in granules or expandable beads) by the General Electric Co., USA, and of the product of the Huntsman Chemical Co., Chesapeake, Va., USA, marketed under the trade-name GECET (polymeric alloy of PS-PPO).

The pre-expanded polymer used in the present invention has advantageously been subjected beforehand to an expansion process and has a granular, spherical or bead-like shape.

The composite polymeric material according to the present invention preferably consists of a uniform dispersion of pre-expanded granules or beads in a matrix of a polyurethane, melaminic or phenolic resin.

Preferably, the polyurethane used in the present invention is obtained by condensation of an isocyanate or polyisocyanate with a compound possessing active hydrogen, both selected so as to have the following characteristics:

low reactivity; a delayed polymerization time of at least about 30 seconds allows the two components still in a fluid state to easily reach the lowest part of a mold wherein pre-expanded granules or beads are packed and then initiate the polymerization phase, so that when the polymerisation phase is completed, all (or almost all) the voids among the beads are filled with polyurethane (about 50% of the total volume of the mold);

optimal cohesion properties and adherence to the expanded beads;

optimal mechanical resistance;

low initial viscosity of the mixture of the two components, allowing an easy penetration in the voids created among the expanded beads;

high expansion capacity allowing the complete filling of the free spaces so as to obtain a homogeneous structure of the composite material;

high heat resistance;

high self-extinction.

Examples of such components are the isocyanate marketed by Dow Chemical Co., USA under the name VORACOR CD 526 and the polyol marketed by Dow Chemical Co., USA, under the name VORACOR CD 443.

The composite material having a polymeric base, according to the present invention, has high impact energy absorption because, following an impact, the impact energy is transmitted along the resinous structure, which has acquired a cellular structure whose cells internally contain the expanded polymeric granules, which undergo elastic deformation and considerably contribute to damping propagation of the shock wave and to ensuring the preservation of impact energy-absorbing properties even with subsequent impacts.

In view of these characteristics, the composite material according to the invention is particularly suitable to provide lightweight manufactured articles having high mechanical strength and resistance to impact energy and to repeated impacts.

Said manufactured articles comprise, in variable amounts, the composite material according to the invention, alone or associated with other impact-resistant materials.

Comparative tests have shown that the manufactured articles according to the invention have higher energy absorption than polystyrene and, for an equal density with respect to polyurethane, are more resistant to impact energy and to repeated impacts.

The manufactured articles according to the present invention can be entirely made of the above-described composite material or are constituted by multilayer structures in which, for example, one or more layers are made of the composite material and the remaining layers are made of other materials (polymeric and nonpolymeric).

According to another aspect of the present invention, said manufactured article is a liner for helmets, for example of the type for motorcycles, cars, work or sport. Helmet liners manufactured with the composite polymeric material according to the invention are highly resistant to impact energy and in particular maintain their impact-resistance characteristics substantially unchanged even after one or more impacts.

In particular, it has been observed that the permanent deformation of the surface structure of the manufactured article according to the invention produced by a medium-energy impact does not compromise, except to a limited extent, its strength and safety characteristics, making them suitable for prolonged use.

According to a further aspect, the present invention relates to a life preserver which comprises the composite material described above. Advantageously, said life preserver is constituted by a core made of very hard polymeric material or wood or steel, covered with a layer of the composite material according to the invention. The life preserver according to the invention has a weight which can be likened to that of life preservers of the prior art together with high impact resistance.

In accordance with yet another aspect of the present invention, said manufactured article is an automotive interior, such as door paddings, door panes, knee bolsters, head restraint systems, sun vizors, instrument panels, rear parcel shelves, or an automotive exterior such as bumpers, body supports or an automotive cavity filling.

In accordance with another aspect of the present invention, a method for producing manufactured articles made of composite material is provided, said method comprising the steps of:

injecting into a mold a pre-expanded polymer selected from the group consisting of polystyrene, polypropylene, polystyrene copolymer with a melting point above 90° C. and mixtures thereof, and in then injecting a resin or the reagents that polymerize into a resin selected from the group consisting of polyurethane resin, phenolic resin, melaminic resin and mixtures thereof;

expanding said resin inside the mold, dispersing said pre-expanded polymer therein.

Preferably, the pre-expanded polymer is supplied in the form of granules or beads which have dimensions between 3 and 10 mm and the polymerization reaction to generate said resin occurs at a temperature between 70 and 140° C.

According to a preferred embodiment of the method according to the invention, the following operating steps are performed in sequence:

filling a mold with granules of a pre-expanded polymer selected from the group consisting of polystyrene, polypropylene, copolymer of polyphenylene oxide and polystyrene and mixtures thereof;

subsequently injecting in the mold an isocyanate or a polyisocyanate and a compound possessing active hydrogen thereby they are filled in void spaces among the granules, condensing said isocyanate or polyisocyanate with a compound possessing active hydrogen to generate, by polymerizing, a polyurethane foam which, by expanding, substantially completely fills the spaces among the pre-expanded polymer granules.

It has been observed that by initially filling the mold with the pre-expanded polymer in granular or bead form and then injecting the polyurethane, it is possible to determine the weight and therefore the density of the manufactured article.

Preferably, the reaction for condensation between the isocyanate and the compound possessing active hydrogen determines a temperature between 70 and 140° C. In the execution of the method it is possible to use expansion agents, additives and catalysts for the condensation reaction capable of accelerating polymerization and resin hardening times.

The reagents are preferably injected by using positive-displacement pumps with a variable rotation rate and a mixer for mixing the two streams of reagent.

The term "compound possessing active hydrogen" denotes a compound that may be replaced by sodium and with a few compounds having hydrogen atoms not readily replaced by sodium. In the reaction with said compounds possessing active hydrogen, the hydrogen atom becomes attached to the nitrogen of the isocyanate and the remainder of the active-hydrogen compound becomes attached to the carbonyl carbon. Said compounds possessing active hydrogen include compounds having amino, hydroxyl, carboxyl groups, particularly polyesters, polyethers and polyols, the last being preferred.

The polyurethane condensation or foaming step advantageously entails expansion times lasting between 10 and 15 minutes, during which the polyurethane foam expands into the empty volume between the polymer granules.

In accordance with an embodiment of the method according to the invention, the mold is filled initially with the pre-expanded polymer.

Preferably, the mold is initially completely filled with beads of expanded material with suitable dimensions and bulk density.

The polyurethane resin suitable for use in the present invention has a high fluidity and a delayed polymerization time, of at least 30 seconds, so as to allow the passage of the resin through all the expanded material filled in the mold, in the void spaces among the beads.

Moreover, the polyurethane resin used in the present invention has a high polymerization heat.

Due to the properties of the isocyanate and active hydrogen containing compound, as indicated above, in particular due to their high fluidity and low polymerization time, the isocyanate and the active hydrogen containing compound are filled in substantially all the empty spaces among the pre-expanded polymer beads.

Due to the granular (or bead-like) shape of the polymer, empty spaces remain between the granules and are gradually filled during the expansion of the polyurethane resin. A composite material is thus obtained which has a substantially uniform distribution of the pre-expanded polymer granules.

It has been observed that the pre-expanded polymer granules or beads, during the exothermic reaction for the polymerization of the polyurethane resins, behave differently according to the chemical nature of the polymer being used.

In particular, when granules or beads of expanded polypropylene or of an interpolymer of polyphenylene oxide and expanded polystyrene are used, the polyurethane condensation reaction can occur at a temperature between 100 and 140° C. without causing their melting or breakdown. The polypropylene beads, amalgamated in the polyurethane foam, by being filled with air, can compress under the impact energy and then resume their initial position, thus dissipating the kinetic energy. It has been observed that the resulting composite material has the highest impact-resistance characteristics.

Instead, when polystyrene granules or beads are used in the process, the generation of heat (T=80–100° C.) typical of the exothermic polymerization reaction of polyurethane causes them to melt. The granules, under the heat, melt inside the polyurethane foam, creating voids.

The granules or beads used in the process according to the invention are expandable polymers, expanded for example by subjecting polymeric expandable beads to a pre-expansion in a pressurized vessel using dry saturated steam. Then the pre-expanded beads are subjected to a drying step and to a maturing stage to compensate for the temporary vacuum in the cell structure after pre-expansion. This is achieved, for example, by blowing the prefoam into an air-permeable silo. After sufficient air has been diffused into the cells, the matured beads are stable and ready for processing.

The matured prefoam is blown into a mold of the desired shape, preferably until the mold is almost completely filled.

The pre-expanded granules used in the invention preferably have a density between 10 and 80 g/l, while the resins used preferably have a density between 20 and 400 g/l.

The method according to the present invention provides manufactured articles made of composite material with modest operating and energy-related costs. In particular, operating costs are reduced thanks to the possibility of using resin molds which are commonly commercially available at low cost. Molds used in the field of the invention are preferably thermostat-controlled, so as to maintain a temperature, during the resin polymerization step, that is lower than the melting temperature of the foamed polymer described above.

Energy expenditure is reduced due to the low operating temperatures of the processing plant.

According to an embodiment of the method according to the invention, manufactured articles of preset shape, such as for example outer shells, reinforcement elements, hooks, nets etcetera, are placed beforehand in the molds.

The following examples are given merely to illustrate the present invention and must not be understood as limiting its scope as defined in the accompanying claims.

EXAMPLE 1

Three types of helmet were manufactured: each helmet had an outer shell made of glass fiber and an inner liner having a different composition:

1. Inner liner made of polystyrene with a density of 60 g/l;
2. Inner liner made of polyurethane resin with a density (free expansion) of 60 g/l;
3. Innner liner made of the composite material according to the invention, constituted by an interpolymer of polystyrene and phenylene polyoxide (GECET) dispersed in polyurethane foam produced by condensation between polyol (VORACOR CD 443) and isocyanate (VORACOR CD 526), both of which are marketed by the Dow Chemical Co., USA.

The three types of helmet were subjected to impact testing according to the SNELL 95 standard commonly used in helmet testing.

The conditioning temperature was 50° C.

| Inc | Height | Region | Peak <300 g 1 | Peak <300 g 2 | Peak <300 g 3 |
|---|---|---|---|---|---|
| HEMI | 318 | B | 222 | 353 | 209 |
| " | 235 | B | 449 | 500 | 210 |
| " | 318 | xDx | 136 | 214 | 195 |
| " | 233 | xDx | 242 | 291 | 198 |
| " | 318 | P | 264 | 219 | 235 |
| " | 233 | P | 300 | 243 | 192 |
| " | 318 | R | 177 | 166 | 195 |
| " | 233 | R | 324 | 176 | 168 |
| " | 318 | xSx | 146 | 245 | 154 |
| " | 233 | xSx | 249 | 361 | 213 |

B,B first and second drop test on the front region;
xDx, xDx first and second drop test on the right lateral region;
P, P first and second drop test on the upper region;
R, R first and second drop test on the rear region;
xSx, xSx first and second drop test on the left lateral region.

The helmet produced by using the composite material according to the invention had, following the impact, considerably smaller peaks than found when using helmets having a conventional type of inner liner.

Comparative tests show that the material according to the invention is particularly suitable to form manufactured articles in which high impact resistance is required.

EXAMPLE 2

A method for manufacturing the composite polymeric material according to the invention.

160 g of expanded beads of Noryl EF (G.E. Co., USA) are injected in a resin mold (volume 8 liters) provided with an air vent Sand shaped like an automotive bumper. An air injector then injects 100 parts by weight (100 g) of VORACOR CD 443 polyol and 110 parts by weight (110 g) of VORACOR 526 isocyanate.

The polymerization reaction produces a polyurethane foam which expands completely in approximately 12 minutes at a temperature of approximately 110° C., filling the voids among the foamed polymeric beads.

The mold is then opened and the manufactured article is extracted and finished according to conventional finishing methods which include coloring and decorative methods for modifying and peeling the surface.

What is claimed is:
1. A method for producing manufactured articles made of composite material, comprising the steps of:
   first completely filling a mold with granules of a pre-expanded polymer in granular form, selected from the group consisting of polystyrene, polypropylene, copolymer of polyphenylene oxide and polystyrene and mixtures thereof;

subsequently injecting in the mold an isocyanate mixed with a compound possessing active hydrogen whereby they are filled in void spaces among the granules;

condensing said isocyanate with said compound possessing active hydrogen to yield a polyurethane foam which, by expanding, substantially completely fills the spaces among the pre-expanded polymer granules.

2. A method according to claim 1, wherein the condensation reaction takes place at a temperature between 70 and 140° C.

3. A method according to claim 1, wherein said compound possessing active hydrogen is a polyol.

4. A method according to claim 1, wherein the pre-expanded polymer is a copolymer of polyphenylene oxide and polystyrene or expanded polypropylene and in that the polyurethane condensation reaction occurs at a temperature between 100 and 140° C.

5. A method according to claim 1, wherein the expanded product has a density between 10 and 80 g/l.

6. A method according to claim 1, wherein the polyurethane resin has a density between 20 and 4000 g/l.

7. A method according to claim 1, wherein said mold includes a manufactured article having a preset shape.

8. The method according to claim 1, wherein the isocyanate and the active hydrogen containing compound having a polymerization time higher than 30 seconds.

* * * * *